Oct. 15, 1929.　　　　S. B. GOLD　　　　1,731,895
INTERNAL COMBUSTION ENGINE
Filed Jan. 6, 1928　　　2 Sheets-Sheet 2

INVENTOR
Samuel B. Gold
BY
ATTORNEY

Patented Oct. 15, 1929

1,731,895

UNITED STATES PATENT OFFICE

SAMUEL B. GOLD, OF KANSAS CITY, MISSOURI, ASSIGNOR TO WEBER ENGINE COMPANY, OF KANSAS CITY, MISSOURI, A CORPORATION OF IOWA

INTERNAL-COMBUSTION ENGINE

Application filed January 6, 1928. Serial No. 244,871.

My invention relates to internal combustion engines of the two cycle type wherein the crank case of the engine is utilized for initially receiving and compressing a fuel charge preparatory to admission of the charge to the combustion chamber, and has for its principal object to prevent breathing of the crank case through the crank shaft bearings ordinarily incident to pressure changes within the crank case, and thereby eliminate interference with proper lubrication of the engine bearings.

Another object of the invention is to provide a simple and efficient packing means whereby such breathing is reduced to a minimum, thus preventing loss or dilution of the fuel charge, resulting in smoother and more economic engine operation without the power losses incident to use of ordinary packing.

In accomplishing these and other objects of the invention I have provided improved details of structure, the preferred forms of which are illustrated in the accompanying drawings, wherein.

Figure 1:
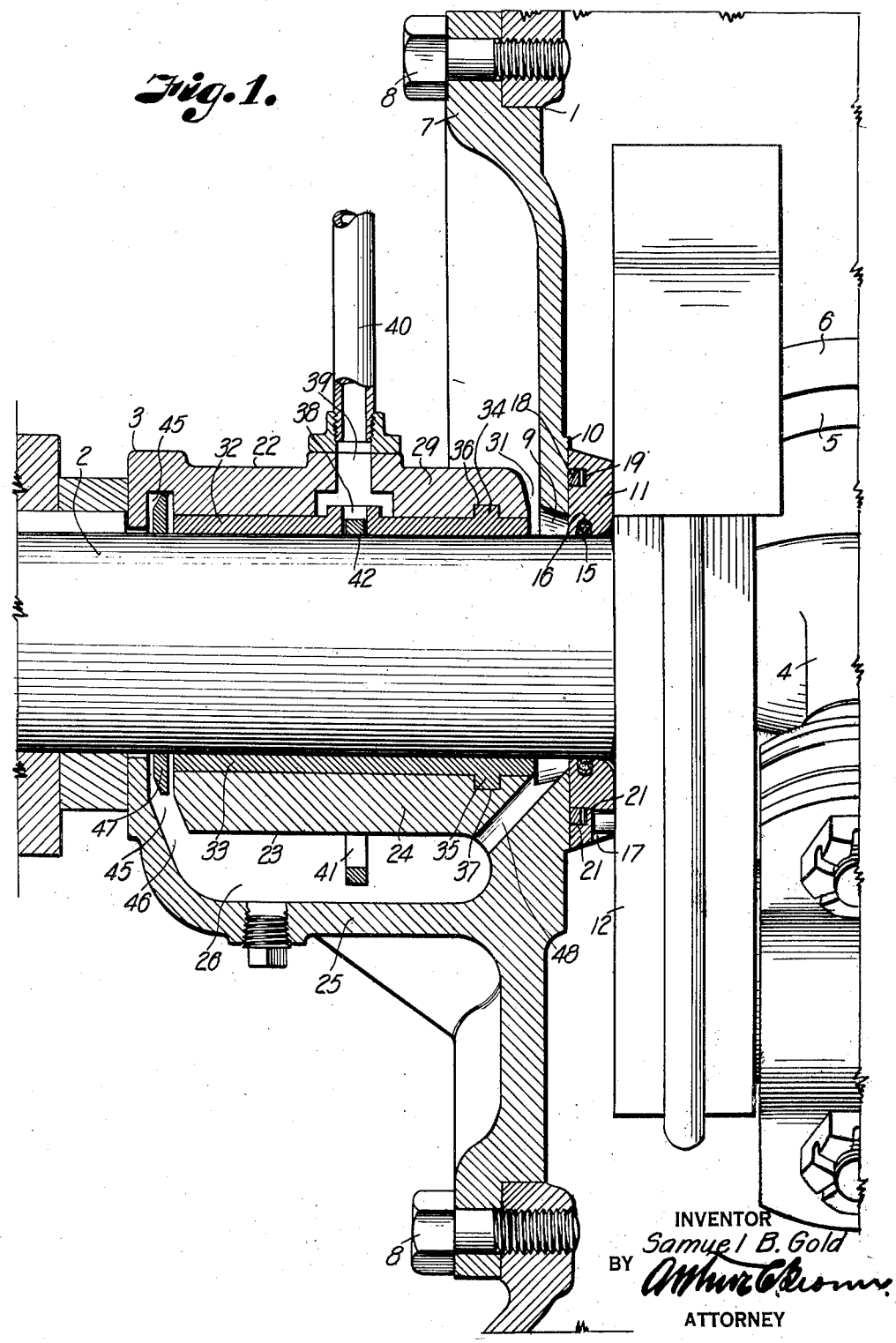
Fig. 1 is a vertical sectional view through a bearing side of an engine crank case constructed according to my invention.
Figure 2:
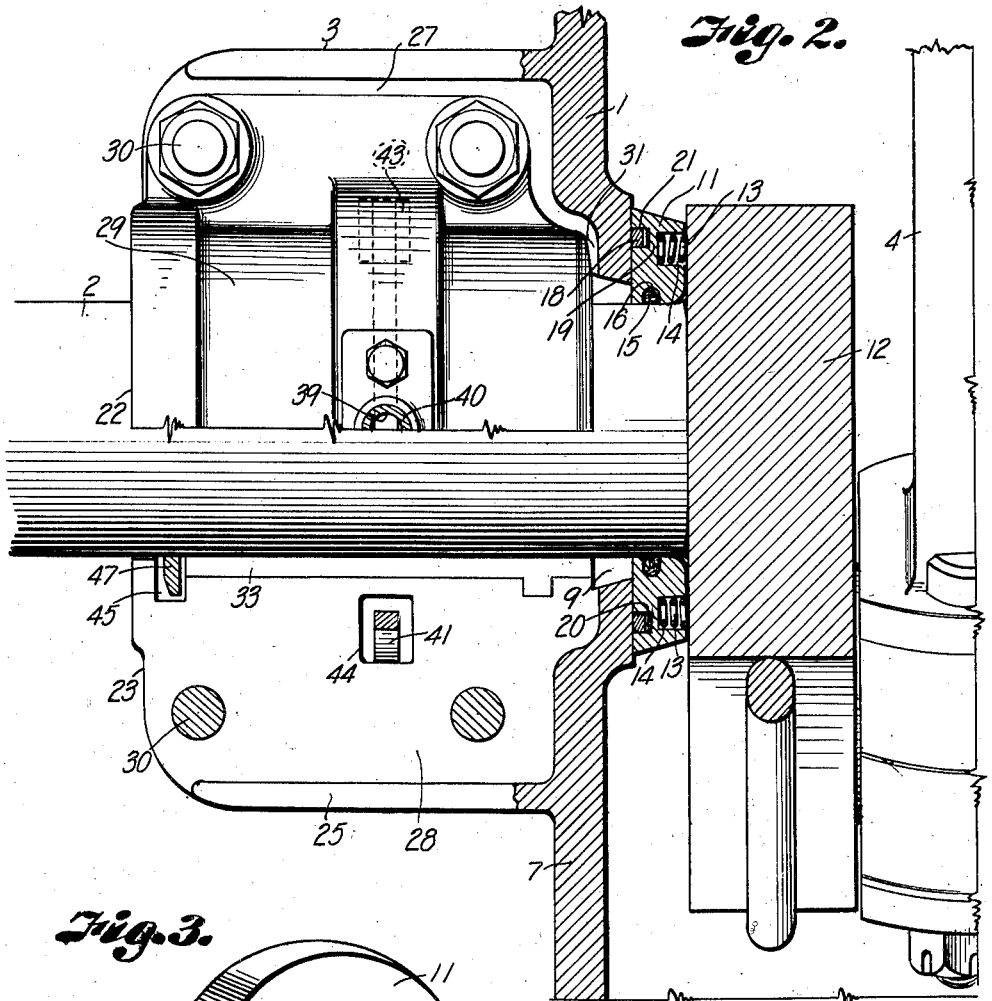
Fig. 2 is a horizontal sectional view through the same, part of the bearing cap being illustrated in plan.
Figure 3:
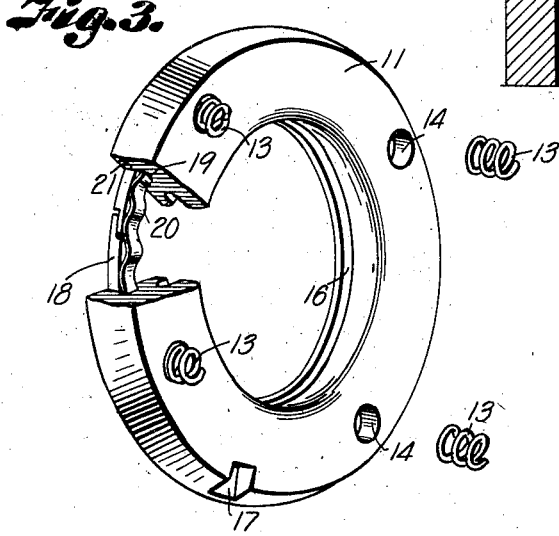
Fig. 3 is a detail perspective view of the packing ring and its retaining springs.

Referring in detail to the drawings:

1 designates the crank case of a two cycle internal combustion engine provided with the usual crank shaft 2, carried in bearings 3 at the sides of the crank case, and actuated through a connecting rod 4 by a piston 5 slidable within the cylinder 6, the cylinder being in communication with the crank case so that upon forward movement of the piston a charge is drawn into the crank case and on the return stroke the charge is compressed and forced into the combustion chamber of the engine as in common practice incidental to two cycle operation.

In engines of this type the alternate suction and compression pressures in the crank case cause a breathing action which tends to alternately suck air from the atmosphere and blow the compressed charge through the crank shaft connection with the crank case and consequently, through the crank shaft bearings, resulting in an inefficient operation of the engine. Furthermore, the continual suction and blowing through the bearings seriously interferes with their proper lubrication, since the lubricating oil is sucked into the crank case or blown out of the bearings, resulting in extravagant waste of the lubricant or a dry bearing from lack of sufficient lubricant.

Heretofore, packings have been employed in an attempt to prevent breathing around the crank shaft, but such packings eventually leak due to uneven expansion of the bearing members or from other causes, the leakage always taking place through the crank shaft bearings since they are in direct communication with the crank case at one end and open to the atmosphere at the other, differential pressures at opposite ends of the bearings causing currents to flow through the bearing to equalize the differential pressures.

I, therefore, provide in the restricted space available, packing structure whereby such breathing and loss of power in the packing is reduced to a minimum, and so construct the bearings that should leaking take place, the leak does not occur through the bearing.

In my preferred construction the crank case 1 is provided with side plates 7 bolted to opposite sides of the case, as at 8, and having outwardly tapering shaft openings 9 of somewhat larger diameter than the bearing end of the crank shaft 2 which projects therethrough and is supported by the bearings 3 as hereinafter described.

By constructing each side plate of a single unit, an unbroken boss or ring race 10 may be provided on its inner face about the shaft opening which may be machined in a perfect plane to provide sealing contact with packing means now described.

The packing means comprises a ring-shaped member 11 snugly received on the shaft 2 between the race 10 and the crank arm 12 of the shaft; and having a ground outer face adapted for rotative contact with the race 10 against which it is held in intimate contact by expansion springs 13, the springs being received in sockets 14 formed in the inner face of the ring, and bearing against the arm 12 of the crank shaft 2. The ring thus slides on the shaft to automatically take up wear between the ring and the race due to the pressing influence of the springs and the seal between the ring and the shaft is maintained by a packing of felt or the like 15 retained in an annular groove 16 in the inner periphery of the ring. As above mentioned the ring 11 is adapted for rotation against the race and is driven by a pin projecting laterally from the crank arm 12 and engaging in a recess 17 formed in the periphery of the ring so that as the crank rotates the ring is carried therewith in wiping contact with the race. The sealing contact of the ring and its race is further supplemented by a split expanding ring 18 received in a peripheral groove 19 formed in the face of the ring and supported in contact with the race by a spring tension ring 20 inserted between the ring and the bottom of the groove. The ring is so constructed that its natural expansion causes it to snugly engage the outer wall 21 of the groove for preventing the passage of oil or breathing under the ring. The ring 18 also obstructs and retains lubricant that is centrifugally driven between the packing ring and its race for providing a supply of lubricant for the wiping contact of the packing ring and its race.

Oil mist from the connecting rod lubrication which condenses on the side plates and oil from the bearing which is stopped by the packing usually furnishes sufficient lubrication for the ring and ordinarily obviates necessity for an additional channel through which lubricant may be supplied.

By thus sealing the crank shaft openings, an efficient seal is provided, with a minimum power loss due to friction, the springs only being strong enough to maintain the ring in sealing contact with the race and to overcome vacuum pressures existing in the crank case during the suction cycle, the compression pressure automatically supplementing action of the springs when pressure exists in the crank case.

The main bearings 3 are so designed and positioned externally of the crank case as to provide quick and easy removal for inspection and are preferably of the two piece type comprising upper and lower halves 22 and 23.

The lower half 23 of the bearing is preferably integral with the side plates and comprises a semi-cylindrical flange 24 projecting from the outer face of the plate in line with the opening 9, and enclosed by a jacket 25 spaced from the flange to provide an oil sump 26 for receiving and retaining a supply of lubricant below the flange 24 as hereinafter described.

The flange 24 and the jacket 25 are integrally connected by lateral extending side wings 27 and 28 forming a seat for a bearing cap 29 comprising the upper half of the bearing and which is attached thereto in the usual manner by the bolts 30. The cap portion 29 is so constructed and positioned upon the lower portion of the bearing that an arcuate shaped air port 31 is provided between the bearing cap and the side plate 7 to provide open communication of the annular space formed by the plate opening 9 with the atmosphere and relieve the bearing from influence of differential pressures leaking from the crank case past the packing.

The bearing flange 24 and the cap 29 are preferably provided with renewable liners 32 and 33 secured therein by flanges 34 and 35 formed on the backs of the liners and received in complementary grooves 36 and 37 respectively so that when the bearing cap is secured in position on its seat, the liners are securely held in functional position.

In order to insure proper lubrication for the bearing I prefer to provide a dual lubrication comprising a positive lubricant feed of fresh lubricant and for the return of the lubricant by ring oilers as now described.

The bearing cap is provided substantially centrally thereof and in line with a slot 38 cut in the upper bearing liner 32 with an oil port 39 to which is connected a supply pipe 40 from a sight feed lubricator or like device so that oil is fed onto the shaft through the slot 38 from which it drains into the sump 26 and is recirculated over the bearing by an oiling ring 41 received in the slot and bearing in wiping contact with the shaft as at 42, the ring extending into the sump through openings 43 and 44 in the lateral wings 27 and 28 on opposite sides of the shaft so that oil from the sump is picked up by the ring and returned to the shaft due to floating rotation of the ring caused by wiping contact thereof with the shaft.

In order to prevent oil from splashing out of the sump and from escaping around the outer end of the bearing, the bearing members are provided adjacent their outer ends, with an internal groove 45 in communication with the sump through a port 46 and receivable in the groove is a baffle ring 47 loosely mounted on the shaft and idly rotatable therewith so that oil traveling on the shaft is stopped thereby and directed into the sump.

Oil from the opposite end of the bearing is returned to the sump through a downwardly inclined port 48 opening from the lower edge of the shaft opening 9 in the side plate and emptying into the upper portion of the oil sump below the flange 24, the oil returning by gravity since the port 48 is in communication with the atmospheric port 31 through the space between the shaft and the edge of the side plate and the pressure therein is consequently equal to the atmospheric pressure maintained in the sump.

Attention is also called to the fact that vacuum existing in the crank case cannot siphon oil from the sump through the port 48 since the vacuum is broken by the atmospheric port 31, nor can pressures be built up in the sump due to compression leaking past the packing as such leaking takes place directly to atmosphere through the port 31.

Nor can differential pressures which may leak through the packing affect the lubricating film of oil on the crank shaft bearing as equal pressures are maintained at both ends of the bearing, since both ends of the bearing are in open communication with the atmosphere, thus maintaining atmospheric pressure within the bearing, the leakage through the package being readily relieved to atmosphere through the port 31 before the leaking can enter the bearing.

The crank opening, as before mentioned, is outwardly tapered so that oil from the bearing coming in contact with the packing ring and any oil leaking past the packing from the crank case, will readily drain back into the sump. The packing ring may also be tapered towards the crank to direct surplus oil away from the contact point of the packing ring with the race.

What I claim and desire to secure by Letters Patent is:

1. In combination with a case having a shaft opening and a rotatable shaft projecting through the opening, a bearing for the shaft attached to the case in line with and covering the opening, means sealing the opening about the shaft, and means communicating the opening with atmosphere between said sealing means and the bearing having sufficient capacity to allow escape of leakage past the sealing means to atmosphere for preventing breathing through the bearing.

2. In combination with a case having a shaft bearing and a shaft rotatably mounted therein, means for sealing the bearing from the interior of the case, and means whereby differential pressures in the case exhaust to atmosphere between the bearing and the sealing means.

3. In combination with the crank case of a two cycle engine, a crank shaft, a bearing for the crank-shaft comprising a lower portion projecting exteriorly of the crank case and a cap portion spaced from the crank case to provide an air port, and means sealing the crank case about the crank shaft adjacent the bearing.

4. In combination with a case having other than atmospheric pressures, a shaft bearing extending integrally from the case, a crank shaft rotatably mounted in the bearing, packing on the shaft closing communication between the bearing and the case, and means for maintaining atmospheric pressures at the ends of the bearing.

5. In combination with a case containing other than atmospheric pressures and having a shaft opening, a bearing in communication with the opening, a shaft rotatably mounted in the bearing, a packing ring on the shaft, covering the opening and rotatably engaging the case to close communication with the bearing, an oil sump for the bearing, means connecting the sump with the shaft opening, and means between the oil sump and the case for admitting atmospheric pressures into the bearing.

6. In combination with a case having other than atmospheric pressures, a shaft bearing externally mounted on the case and having communication with the case, a shaft rotatably mounted in the bearing, a packing ring on the shaft rotatably engaging the case and closing communication between the bearing and the interior of the case, a supplemental ring in the packing ring and engaging the case for controlling a lubricant, means yieldingly retaining the ring in functional position, and means for maintaining atmospheric pressures at the exterior ends of the bearing.

7. In combination with a case having other than atmospheric pressures, and a shaft extending through the case, a bearing for the shaft comprising a lower portion integrally projecting from the case, and a cap portion spaced from the case to provide an outlet for leakage about the shaft to prevent the leakage from passing through the bearing.

8. In combination with a case and a shaft projecting through the case, a bearing for the shaft extending from the case and having an arcuate shaped port adjacent the case communicating the interior of the bearing with atmosphere.

9. In combination with a case having a shaft receiving opening and having differential pressures, and a shaft projecting through the opening of smaller diameter than the opening to provide an annular space about the shaft, means within the case closing off the annular space from the interior of the case, a bearing for the case in communication with the annular space having an arcuate port communicating with the annular space to relieve the bearing from influence of differential pressures leaking from the case into the annular space.

In testimony whereof I affix my signature.

SAMUEL B. GOLD.